March 21, 1950     D. C. WARREN     2,501,638
CIRCULATING HEAD
Filed Feb. 2, 1948
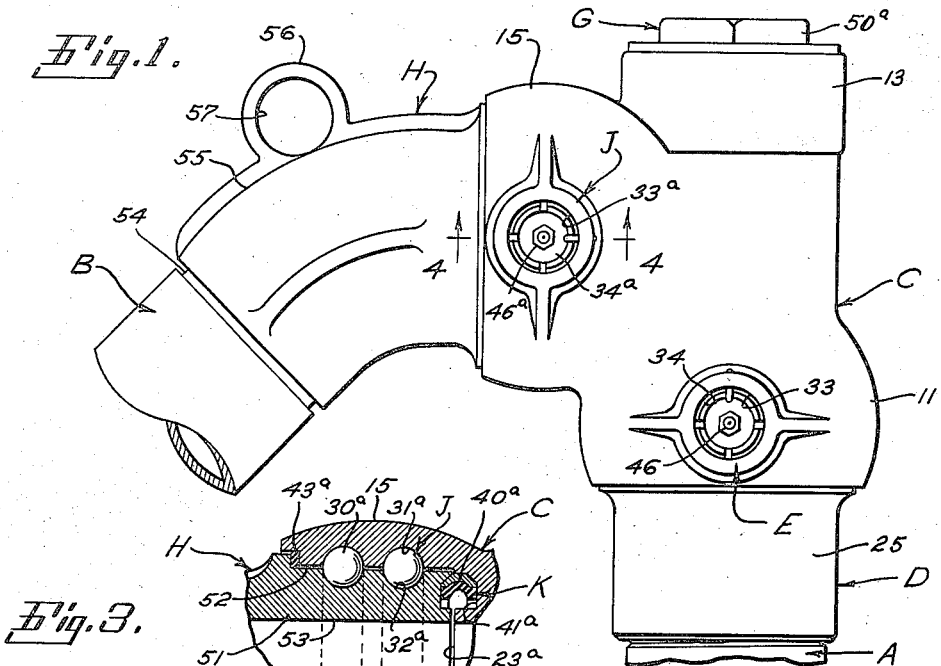
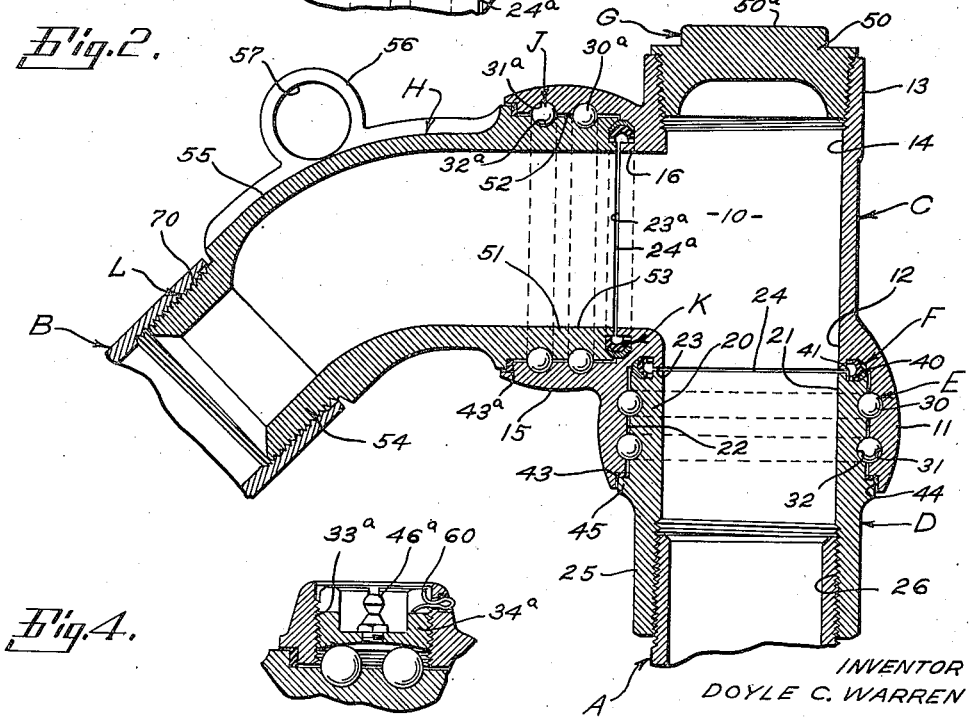
INVENTOR
DOYLE C. WARREN
BY
ATTORNEY Patented Mar. 21, 1950

2,501,638

UNITED STATES PATENT OFFICE 2,501,638

CIRCULATING HEAD

Doyle C. Warren, Monrovia, Calif., assignor to Chiksan Company, Brea, Calif., a corporation of California Application February 2, 1948, Serial No. 5,871

4 Claims. (Cl. 285—213)

This invention relates to a circulating head and it is a general object of the present invention to provide a simple, practical, dependable head applicable to the upper end of a casing, tubing, or other part extending from a well to make connection between such member and a hose or the like.

In the drilling and operation of wells, particularly oil wells, tubular members extending into the well are required to be coupled with a fluid conduit such as a hose, or the like, through a connection that will allow free rotation of the member that extends into the well, while the conduit or hose remains relatively stationary and serves primarily to allow for vertical movement of the member extending into the well. Such devices are commonly termed swivels or swivel heads, and are used extensively on the upper ends of kellys or like parts during drilling, the usual swivel being a large complicated and expensive construction totally impractical for use in many cases where a head of the character referred to is required, but is not subject to severe conditions such as obtain during drilling.

A general object of the present invention is to provide a head of the general character referred to applicable to the upper end of a tubular member such, for example, as a casing or a kelly, and including a body and a casing coupler joined through a simple practical connection which enables the body to turn freely relative to the casing.

A further object of the invention is to provide a structure of the general character referred to in which a removable closure is provided at the upper end of the body which closure is such that a large clear access opening is provided in the body when the plug is removed, permitting the passage of instruments or tools into and out of the casing at will.

It is a further object of the present invention to provide a head of the general character referred to including a hose coupler joined to the side of the body to be freely rotatable relative to the body and provided at its outer end with means for making connection with a pipe hose or other fluid conduit.

Another object of the present invention is to provide a head of the general character referred to involving a simple practical dependable coupling means rotatably joining the casing and hose coupler to the body.

The various objects and features of my invention will be fully understood from the detailed description of a typical preferred form and application of the invention, throughout which description reference is made to the accompanying drawings, in which:

Fig. 1 is a side elevation of the head provided by the present invention showing it applied to the upper end of a casing or the like, and showing a fluid conduit joined thereto. Fig. 2 is a vertical sectional view of the structure shown in Fig. 1. Fig. 3 is an enlarged detailed view of a portion of the structure shown in Fig. 2, and Fig. 4 is an enlarged detailed sectional view taken as indicated by line 4—4 on Fig. 1.

The head provided by the present invention is applicable, generally to a part or member such as a tubular member that may project from a well. In the drawings I show a tubular casing A having the head of the present invention mounted thereon. The construction of the present invention may serve to connect any suitable fluid conduit B with the casing A, and, in practice, it ordinarily serves to connect a structure known as a hose to the casing A. The hose may be a flexible structure formed of suitably connected metallic sections or it may be formed primarily of a flexible material such as rubber or the like. In the drawings I have shown the coupling end of conduit B of a fluid conduit joined to the head so that the head serves as a coupling or connection between the conduit and the casing.

The head provided by my invention involves, generally, a body C, a casing coupler D applicable to the casing A and engageable with the body C, means E rotatably coupling the coupler D and the body C, packing means F sealing between the coupler D and the body C, a closure G for the upper end of the body C, a hose coupler H engageable with the side of body C, means J rotatably coupling the hose coupler H and the body C, packing means K between the coupler H and the body C and means L at the outer end of coupler H for making connection with the coupling end of the conduit B.

The body C is preferably a simple unitary member, say for instance, a casting having a flow passage 10 therein or therethrough. The body has a depending lower end portion 11 with an opening 12 communicating with the coupler D and it has an upper end portion 13 provided with an opening 14 normally closed by the closure G. A lateral extension 15 is provided at one side of the body and has an opening 16 that communicates with the coupler H. It will be observed from Fig. 2 of the drawings that the several openings 12, 14 and 16 are connected or are in full communication with the passage or opening 10 in the body C.

The coupler D serves as a connection between the body C and the casing or member A, being rotatably coupled to the body by the means E and sealed therewith by the means F. In the preferred form of the invention the coupler D is a simple tubular part with an upper end portion 20 having a bore or passage 21 therethrough corresponding in size with the opening 12 in the end portion 11 of body C. The end portion 11 of the body has a bore or socket 22 entering it from its lower end and terminating in a shoulder 23. The bore 22 is considerably larger in diameter than opening 12 and receives the end portion 20 so that its upper end 24 is at or close to the shoulder 23.

The lower end portion 25 of the coupler D depends below the lower end of body part 11. In the case illustrated the portion 25 of the coupler is provided with a threaded opening 26 entering from the lower end of the coupler to receive the upper end of member A as clearly shown in Fig. 2 of the drawings. Where a threaded connection is provided between the coupler D and casing A it is desirable that the portion 25 of the coupler exposed below the lower end part 11 of the body be of such extent as to present a surface that can be effectively engaged by a suitable wrench or the like.

The means E rotatably coupling the body C and coupler D is preferably an anti-friction means. In the form of construction illustrated the means E involves two axially spaced rows of balls 30 arranged between the portions 11 and 20 of the body and coupler, respectively. The wall of the bore 22 is provided with ball receiving grooves or raceways 31 while the exterior of the coupler part 20 is provided with ball receiving grooves or raceways 32 that register with the raceways 31 and cooperate therewith in forming channels that carry the balls 30. A lateral opening 33 is provided in one side of the part 11 of the body which opening communicates with the raceways carrying the balls 30 and provides a passage through which the balls can be arranged in or removed from the raceways. The opening 33 is normally closed by a plug 34. The details of the opening 33 and plug 34 at the end part 11 of the body may be the same as the corresponding parts at the end part 15 of the body which are shown in detail in Fig. 4 of the drawings.

The sealing means F preferably involves a main seal or packing ring 40 engaged between the inner end 24 of coupler D and the shoulder 23 in the body. In the particular form of the invention illustrated registering recesses or channels 41 are provided in the end 24 of the coupler and the shoulder 23 to receive and carry the packing ring 40, and the ring is preferably a chevron type packing ring expanded into sealing engagement with the parts with which it contacts by pressure from within the structure. A secondary sealing ring 43 is provided at the outer end of the end portion 11, which ring is carried in an enlarged portion 44 of bore 22 to engage a flange 45 on the exterior of the coupler D. It is to be observed that the rows of balls 30 of means E occur between the packing rings 40 and 43 so that lubricant, such as grease, introduced through a suitable fitting 46 in the plug 34 is confined to the anti-friction means E and at the same time foreign matter is excluded from the means E.

The closure G is provided at the upper end of the body part 13 and is shown releasably joined or coupled to the body so that it can be removed therefrom when it is desired to insert tools or instruments into the member through the head. In the drawings the closure G is shown as involving a simple plug 50 screw threaded into the upper end of body part 13 and having a head 50ª at its outer end that is readily accessible and is so formed or constructed that it can be readily engaged by a suitable tool such as a wrench or the like.

The hose coupler H is an elongate tubular part with an inner end portion 51 engageable in a bore 52 provided in the lateral projection 15 on the side of body C. The bore 52 is considerably larger than the lateral body opening 16 and it is preferred that the opening 53 in the tubular part 51 be substantially the same in size as the opening 16, as shown in Fig. 2 of the drawings.

The hose coupler H has an outer end portion 54 provided with the means L for making connection with the conduit B and a neck portion 55 joins the portions 51 and 54. In the particular form of the invention illustrated the neck portion 55 is of considerable length and is arcuate or curved in form so that the end portions 51 and 54 are not in line with each other, but rather are angularly related as clearly illustrated in the drawings.

A supporting lug 56 projects from the coupler H preferably from the neck portion 55 thereof. In the preferred form of the invention the lug 56 is formed on or projects from the outer or convex side of the neck. Under normal operating conditions the coupler H will be positioned substantially as shown in the drawings, in which case it extends outwardly and downwardly from the point where it connects with the body C under which conditions the lug projects upwardly in a manner to be conveniently engaged by a hook or line, such as may be employed for handling the structure in the course of applying it to or removing it from the member A. The lug 56 is shown provided with an eye opening 57 to receive suitable handling equipment such as a hook or line.

The means J rotatably coupling the coupler H and body C is preferably an anti-friction means corresponding in form and construction with the means E as above described. The means J is shown as involving balls 30ª in registering grooves 31ª and 32ª in the body part 15 and coupler part 51, respectively. As shown in the drawings an access opening 33ª communicates with the ball carrying channels and a plug 34ª normally closes the opening 33ª. A releasable lock or key 60 holds the plug against displacement and a lubricant fitting 46ª is provided in the plug to facilitate the introduction of lubricant to the means J.

The packing means K seals between the parts 51 and 15 of the coupler H and body C, respectively. As shown in Fig. 3 of the drawings the packing means involves a packing ring 40ª carried in registering grooves or channels 41ª in the shoulder 23ª in the body and the end 24ª of the coupler part 51. A secondary sealing ring 43ª may be provided between parts 15 and 51 the same as the ring 43 is provided between the coupler D and part 11, as above described.

The means L provided for making connection between the coupler H and member B may be any suitable connection or connecting means that will serve to couple a conduit with the coupler H. In the drawings the means L is shown as a thread 70 on the outer end portion 54 so that the part B simply threads onto or over the part 54.

From the foregoing description it will be apparent that I have provided a head which involves few simple parts, which is easily applied to or coupled with a member A and a conduit B, and which when in place serves to effectively handle fluid without leakage, at the same time allowing free relative movement between the coupled parts. The means E allows for free turning of the member A relative to the body C and the means J allows for free movement of the coupler H relative to the body C so that the member B coupled to the head by means of the coupler H may readily accommodate itself to varying positions such as may occur in the event that member A is moved vertically.

Having described only a typical preferred form and application of the invention, I do not wish to be limited or restricted to the specific details herein set forth, but wish to reserve to myself any variations or modifications that may appear to those skilled in the art and fall within the scope of the following claims.

Having described my invention, I claim:

1. A head of the character described including, a body having a straight vertical opening through it from its upper end to its lower end, a removable closure closing the upper end of the body opening, a casing coupler rotatably coupled to the lower end of the body and in communication with the body opening, and a hose coupler rotatably coupled to the side of the body below the closure, the body forming a substantially uniform flow passage between the couplers, the upper end of the casing coupler terminating below the hose coupler and being free of obstructions.

2. A head of the character described including, a body having a vertical substantially uniform opening through it from its upper end to its lower end, a removable closure closing the upper end of the opening, a straight tubular casing coupler rotatably coupled to the lower end of the body and in communication with the body opening, and an elongate arcuate tubular hose coupler having one end rotatably coupled to the side of the body and having threads at the other end thereof, the body forming a substantially uniform flow passage between the couplers, the upper end of the casing coupler terminating below the hose coupler and being free of obstructions.

3. A head of the character described including, an elongate vertical tubular body having a uniform opening extending from its upper end to its lower end and having a lateral projection with an opening communicating with the vertical opening, the outer end of the opening in the projection and the lower end of the vertical opening being counterbored, a vertical tubular casing coupler entering the counterbore of the vertical opening and terminating therein, balls between the casing coupler and the lower end of the body rotatably coupling the casing coupler and body, an elongate tubular hose coupler entering the counterbore of the opening in the lateral projection, and balls between the projection and hose coupler rotatably coupling the hose coupler and body.

4. A head of the character described including, an elongate vertical tubular body having a uniform opening extending therethrough between the upper and lower ends of the body and counterbored at the lower end of the body, the body having a lateral projection with an opening extending therethrough and communicating with the vertical opening and being the same size as the vertical opening and counterbored at its outer end, a vertical tubular casing coupler entering the counterbore in the vertical opening and terminating therein, balls between the casing coupler and the lower end of the body rotatably coupling the casing coupler and body, packing sealing between the casing coupler and body, an elongate arcuate tubular hose coupler with one end entering the counterbore in the opening in the lateral projection and threaded at the other end, balls between the projection and the first mentioned end of the hose coupler rotatably coupling the hose coupler and body, packing sealing between the hose coupler and body, a support receiving lug projecting laterally from the hose coupler intermediate its ends, and a removable closure closing the upper end of the vertical body opening, the couplers having openings substantially the same size as the said openings in the body.

DOYLE C. WARREN.

REFERENCES CITED

The following references are of record in the file of this patent:

UNITED STATES PATENTS

| Number | Name | Date |
| --- | --- | --- |
| 2,101,937 | Giberson | Dec. 14, 1937 |
| 2,384,360 | Allen | Sept. 4, 1945 |